Patented Oct. 20, 1931

1,828,267

UNITED STATES PATENT OFFICE

FRITZ WILCKE, OF BERLIN-ADLERSHOF, GERMANY, ASSIGNOR TO SCHERING-KAHLBAUM A. G., OF BERLIN, GERMANY

PRODUCTION OF SEBACIC ACID DINITRILE

No Drawing. Application filed October 11, 1928, Serial No. 311,981, and in Germany October 14, 1927.

My invention refers to the production of sebacic acid dinitrile and more especially to means whereby this compound, which is a valuable starting material for the production of pharmaceutical products, can be obtained in an easier and more efficient manner than was hitherto possible.

Up till now sebacic acid dinitrile $$N\equiv C-CH_2-CH_2-CH_2-CH_2-CH_2-CH_2-CH_2-CH_2-C\equiv N$$

has been produced by acting on sebacic acid diamide $$NH_2 \cdot OC \cdot (CH_2)_8 \cdot CO \cdot NH_2$$

with phosphoric acid anhydride, thionyl chloride or phosphorus pentachloride, but owing to the vigour of the reaction and the difficulties experienced in mixing the materials only small quantities could be obtained in each operation.

I have now found that I can produce sebacic acid dinitrile with good yield and in a much easier and more advantageous way by treating sebacic acid diamide with phosphorus oxychloride, this compound being used in slight excess, preferably a solvent free of water, for instance benzene or toluene, being added to the reacting bodies.

*Example 1.*—7.5 kilograms sebacic acid diamide are mixed with 6 kilograms phosphorus oxychloride and the mixture is heated some hours in a steam bath under a reflux condenser. The small quantity of phosphorus oxychloride in excess is decomposed in the usual manner, the phosphoric acid is removed, the product of reaction is washed to neutral reaction and is then distilled in vacuo.

*Example 2.*—To 7.5 kilograms sebacic acid diamide is added a mixture of 6 kilograms phosphorus oxychloride and 7 kilograms benzene. The mass is heated 8 hours in a steam bath under the reflux condenser. When the reaction has come to an end, the solution of sebacic acid dinitrile in benzene is separated from the phosphoric acid sludge which has settled down and is washed to neutral reaction, freed from the benzene and distilled in vacuo, the yield of sebacic acid dinitrile being 4.2 kilograms.

Various changes may be made in the details disclosed in the foregoing specification without departing from the invention or sacrificing the advantages thereof.

I claim:—

1. The method of producing sebacic acid dinitrile comprising acting on sebacic acid diamide with phosphorus oxychloride.

2. The method of producing sebacic acid dinitrile comprising acting on sebacic acid diamide with phosphorus oxychloride in the presence of a hydrocarbon of the benzene series free of water.

3. The method of producing sebacic acid dinitrile comprising acting on sebacic acid diamide with phosphorus oxychloride in the presence of benzene.

4. The method of producing sebacic acid dinitrile comprising heating 6 parts by weight phosphorus oxychloride, which are dissolved in 7 parts by weight benzene with 7.5 parts by weight sebacic acid diamide to steam temperature during about eight hours, separating the solution of sebacic acid dinitrile in benzene from the phosphoric acid sludge, washing the solution with water, removing the solvent and distilling in vacuo.

In testimony whereof I affix my signature.

FRITZ WILCKE.